US009413280B2

(12) United States Patent
Jang et al.

(10) Patent No.: US 9,413,280 B2
(45) Date of Patent: Aug. 9, 2016

(54) INVERTER AND METHOD OF CONTROLLING SAME

(71) Applicant: LSIS CO., LTD., Anyang-si, Gyeonggi-do (KR)

(72) Inventors: Byung Woon Jang, Seoul (KR); Chun Suk Yang, Seongnam-si (KR); Jae Hoon Jang, Seoul (KR); Joong Ki Jung, Seoul (KR); Sun Woo Lee, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/225,047

(22) Filed: Mar. 25, 2014

(65) Prior Publication Data

US 2014/0340019 A1    Nov. 20, 2014

(30) Foreign Application Priority Data

May 20, 2013 (KR) .......................... 10-2013-0056743

(51) Int. Cl.
*H02P 1/24* (2006.01)
*H02P 21/00* (2016.01)
*H02P 23/14* (2006.01)
(Continued)

(52) U.S. Cl.
CPC ............ *H02P 21/0035* (2013.01); *B60L 15/02* (2013.01); *H02P 21/06* (2013.01); *H02P 23/14* (2013.01); *B60L 2210/40* (2013.01); *B60L 2220/12* (2013.01); *B60L 2240/421* (2013.01); *B60L 2240/423* (2013.01); *B60L 2240/429* (2013.01); *B60L 2250/26* (2013.01); *Y02T 10/643* (2013.01); *Y02T 10/644* (2013.01);
*Y02T 10/645* (2013.01); *Y02T 10/7241* (2013.01); *Y02T 10/7258* (2013.01)

(58) Field of Classification Search
CPC ... H02P 21/0035; H02P 6/08; H02P 21/0096; H02P 21/00; H02P 25/023; H02P 6/16; H02P 6/181; H02H 7/122
USPC ......... 318/727, 729, 799, 801, 807, 812, 823, 318/438
See application file for complete search history.

(56) References Cited

U.S. PATENT DOCUMENTS 6,014,006 A * 1/2000 Stuntz ................... H02P 21/141
318/799
6,407,531 B1 * 6/2002 Walters et al. ................ 318/805
(Continued)

FOREIGN PATENT DOCUMENTS

CN        201629679      11/2010
JP        2010-022165     1/2010
(Continued)

OTHER PUBLICATIONS

Shin, "Maximum Torque Control of Stator Flux-Oriented Induction Motor in the Field Weakening Region", Jun. 2001, 134 pages.

*Primary Examiner* — Bentsu Ro
*Assistant Examiner* — Thai Dinh
(74) *Attorney, Agent, or Firm* — Lee, Hong, Degerman, Kang & Waimey PC; Jonathan Kang; Justin Lee

(57) ABSTRACT

An inverter is provided. The inverter includes a current providing unit providing a first axis current and a second axis current to an induction motor; a revolutions per minute (RPM) measuring unit measuring the RPM of the induction motor; and a control unit changing the second axis current according to the measured RPM.

6 Claims, 4 Drawing Sheets

(51) Int. Cl.
  *H02P 21/06* (2016.01)
  *B60L 15/02* (2006.01)

(56) References Cited

U.S. PATENT DOCUMENTS

| | | | | |
|---|---|---|---|---|
| 6,809,492 | B2 * | 10/2004 | Harakawa | H02P 21/00 318/603 |
| 6,836,085 | B2 * | 12/2004 | Kawada et al. | 318/139 |
| 6,844,701 | B2 * | 1/2005 | Chen | H02P 23/0004 318/432 |
| 7,049,782 | B2 * | 5/2006 | Chen | B60L 11/1803 318/432 |
| 7,728,541 | B2 * | 6/2010 | Subrata et al. | 318/449 |
| 7,952,316 | B2 * | 5/2011 | Ganev | H02P 25/22 318/524 |
| 2002/0097015 | A1 * | 7/2002 | Kitajima et al. | 318/432 |
| 2012/0217923 | A1 * | 8/2012 | Wu et al. | 318/610 |

FOREIGN PATENT DOCUMENTS

| | | |
|---|---|---|
| JP | 4556322 | 10/2010 |
| KR | 10-1330661 | 11/2013 |

* cited by examiner

| RPM | D AXIS CURRENT(A) |
|---|---|
| 0 | 60 |
| 250 | 50 |
| 500 | 40 |
| 750 | 35 |
| 1000 | 30.3 |
| LARGER THAN 1000 | 30.3 |

INVERTER AND METHOD OF CONTROLLING SAME

CROSS REFERENCE TO RELATED APPLICATION

Pursuant to 35 U.S.C. §119(a), this application claims the benefit of earlier filing date and right of priority to Korean Application No. 10-2013-0056743, filed on May 20, 2013, the contents of which is incorporated by reference herein in its entirety.

BACKGROUND

The present disclosure relates to an inverter, a core part of an electric vehicle, and more particularly, to enhancing the maximum torque of an induction motor and decreasing energy consumption when an inverter controls the induction motor.

The induction motor is a typical example of an alternating current (AC) motor. In response to sliding when an induced current is generated at a rotor of a conductor due to a rotating field formed by a stator, the induction motor may generate torque and operate a load. The induction motor may be roughly divided into a single-phase induction motor and a three-phase induction motor by an input AC power supply type.

Recently, the induction motor is being frequently applied to an electric vehicle. An induction motor applied to the electric vehicle may be driven through vector control. In this case, the inverter of the electric vehicle controls the torque of the induction motor through a D axis current and a Q axis current.

However, since a typical inverter fixes the D axis current and changes only the Q axis current when controlling the torque of the induction motor, it was difficult to generate the maximum torque of the induction motor.

Also, since a typical inverter fixes the D axis current and changes only the Q axis current in order to generate the same torque, there was a limitation in that current consumption is high.

SUMMARY

Embodiments provide an inverter for changing a D axis current provided to an induction motor and enhancing the maximum torque of the induction motor, and a method of controlling the inverter.

In one embodiment, an inverter includes a current providing unit providing a first axis current and a second axis current to an induction motor; a revolutions per minute (RPM) measuring unit measuring the RPM of the induction motor; and a control unit changing the second axis current according to the measured RPM.

In another embodiment, a method of controlling an inverter includes providing a first axis current and a second axis current to an induction motor; measuring the RPM of the induction motor; and changing the second axis current according to the measured RPM.

DETAILED DESCRIPTION OF THE EMBODIMENTS

Some embodiments are described below in detail with reference to the accompanying drawings. In the following description, since the suffixes "module" and "unit" for components are given and interchanged for easiness in making the present disclosure, they do not have distinct meanings or functions.

In the following description, a motor 200 may be an induction motor, a kind of an alternating current (AC) motor but there is no need to be limited thereto.

Also, in the following, a D axis may be a direct axis and a Q axis may be a quadrature axis. Also, a D axis current may be a direct axis current and a Q axis current may be a quadrature axis current.

Figure 1:
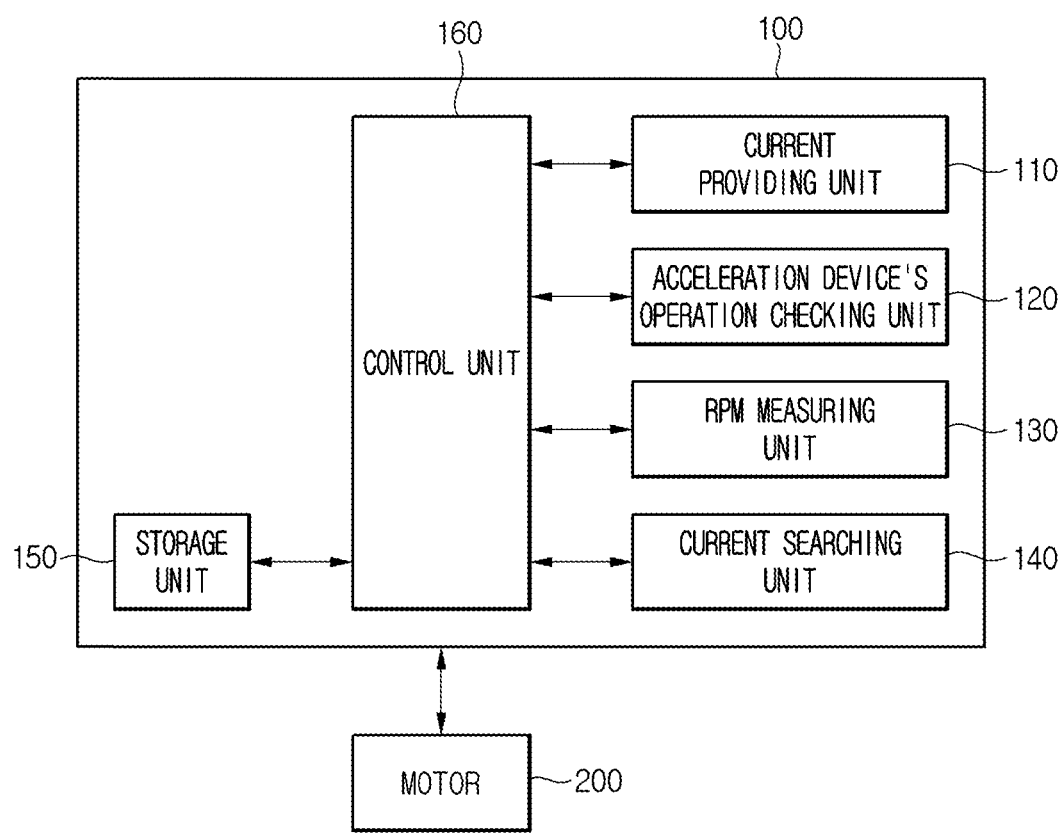
FIG. 1 is a block diagram of an inverter according to an embodiment.

FIG. 1 is a block diagram of an inverter according to an embodiment.

Referring to FIG. 1, an inverter 100 may control the motor 200. The inverter 100 and the motor 200 according to an embodiment may be applied to a neighborhood electric vehicle (NEV) that uses an air-cooling motor. The NEV is a vehicle that may decrease power consumption through decreases in weight and size of a chassis.

The inverter 100 may include a current providing unit 110, an acceleration device's operation checking unit 120, a revolutions per minute (RPM) measuring unit 130, a current searching unit 140, a storage unit 150, and a control unit 160.

The current providing unit may provide an alternating current (AC) current to the motor 200. In an embodiment, the current providing unit 110 may provide a D axis current and a Q axis current to the motor 200. The detailed configuration of the current providing unit 110 is described below.

The acceleration device's operation checking unit 120 may check whether the acceleration device of an EV operates. When a physical force is sensed from an acceleration device, the acceleration device's operation checking unit 120 may determine that the acceleration device operates, and when the physical force is not sensed from an acceleration device, the acceleration device's operation checking unit 120 may determine that the acceleration device does not operate.

When the physical force is sensed from the acceleration device, the RPM measuring unit 130 may measure the RPM of the motor 200.

The current searching unit 140 may search for a D axis current corresponding to the measured RPM of the motor 200, in the storage unit 150.

The storage unit 150 may match the RPM of the motor 200 with the D axis current and store them. A D axis current value corresponding to the RPM may be a value for generating the maximum torque of the motor 200 at a corresponding RPM. In another embodiment, the storage unit 150 may match the RPM of the motor 200, the maximum torque value of the motor 200 corresponding to the RPM, and a D axis current corresponding to the maximum torque value of the motor 200, and store them.

The storage unit 150 may include at least one type storage medium of, for example, a flash memory type memory, a hard disk type memory, a multimedia card micro type memory, and a card type memory (for example, an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The control unit 160 may control the overall operations of the inverter 100.

Figure 2:
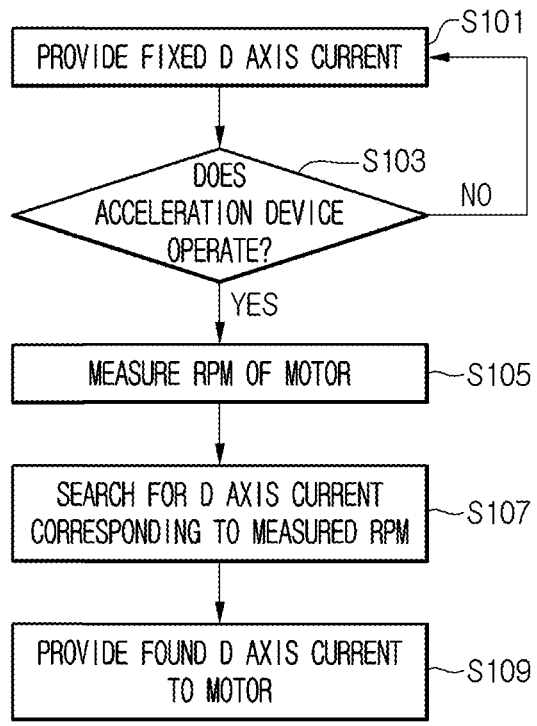
FIG. 2 is a flow chart of a method of controlling a motor of an inverter according to an embodiment.

In particular, the control unit 160 may control the current providing unit 110 so that the current providing unit 110 provides, to the motor 200, the D axis current found in the storage unit 150, FIG. 2 is a flow chart of a method of controlling a motor of an inverter according to an embodiment.

Referring to FIG. 2, firstly, the current providing unit 110 of the inverter 100 provides a fixed D axis current to the motor 200 in step S101. That is, the current providing unit 110 may provide a D axis current and a Q axis current to drive the motor 200, and when an acceleration device to be described below does not operate, the current providing unit 110 may provide a fixed D axis current to the motor 200. More particularly, if a D axis current is provided to the motor 200 even while a physical force is not sensed from the acceleration device, current consumption and heat emission increase and thus the inverter 100 provides a fixed D axis current to the motor 200. In this case, the current providing unit 110 may provide a fixed Q axis current or a changed Q axis current to the motor 200.

The acceleration device's operation checking unit 120 of the inverter 100 checks whether the acceleration device of an EV operates, in step S103. In an embodiment, the acceleration device of the EV may be an accelerator pedal and may be operated by an EV driver's physical force. When a physical force is sensed from the acceleration device, the acceleration device's operation checking unit 120 may determine that the acceleration device operates, and when the physical force is not sensed from the acceleration device, the acceleration device's operation checking unit 120 may determine that the acceleration device does not operate. The acceleration device's operation checking unit 120 may be a pressure sensor, but there is no need to be limited thereto and various sensors that may sense a physical force may be used.

If it is determined that the acceleration device of the EV operates, the RPM measuring unit 130 of the inverter 100 measures the RPM of the motor 200 in step S105. The RPM of the motor 200 may represent how many times the motor 200 rotates per one minute. Since the output power (horse power) of the EV is a value obtained by multiplying torque, namely, turning force of the motor 200 by RPM, when the torque of the motor 200 is constant and the RPM increases, the revolutions of the motor 200 increase and thus the speed of the EV may increase. As will be described below, the reason why the RPM measuring unit 130 measures the RPM of the motor 200 is to change a fixed D axis current to a D axis current corresponding to corresponding RPM and provide the changed D axis current to the motor 200.

The current searching unit 140 of the inverter 100 searches for a D axis current corresponding to the measured RPM of the motor 200, in the storage unit 150 in step S107. In an embodiment, the storage unit 150 may match the RPM of the motor 200 with a D axis current corresponding to the RPM and store them. A D axis current value corresponding to the RPM may be a value for generating the maximum torque of the motor 200 at a corresponding RPM. Related description is provided with reference FIGS. 3 to 5

Figure 3:
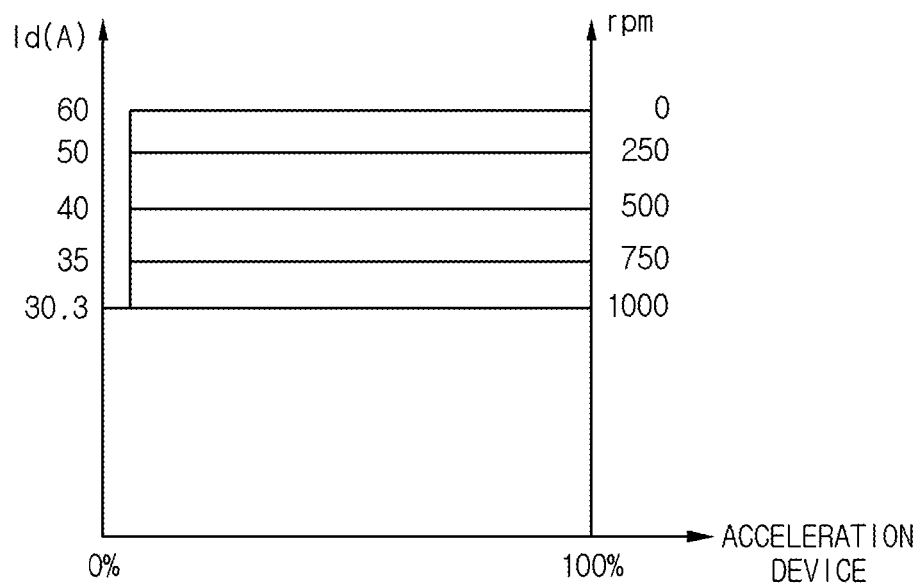
FIGS. 3 and 4 depict a relation between revolutions per minute (RPM) of a motor and a D axis current according to an embodiment.
Figures 4, 5:
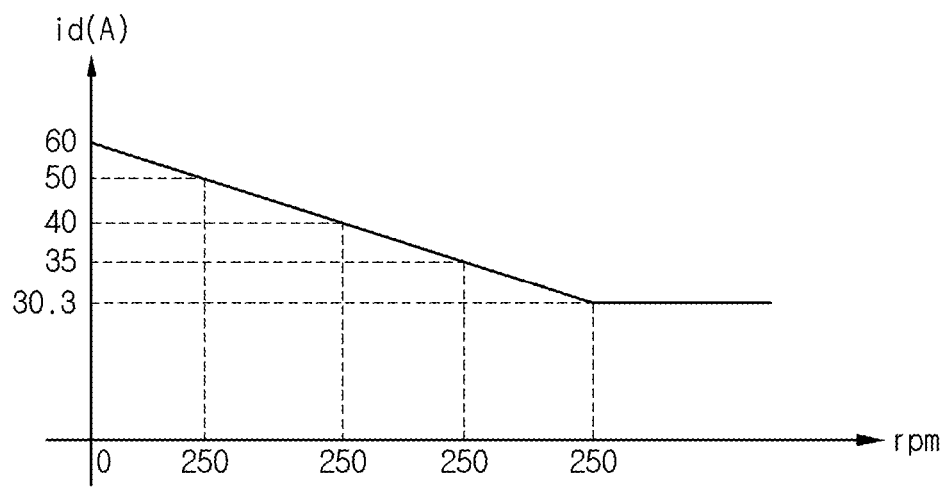
FIG. 5 is an example of a lookup table stored in a storage unit according to an embodiment.

FIGS. 3 and 4 depict a relation between the RPM of a motor and a D axis current according to an embodiment, and FIG. 5 is an example of a lookup table stored in a storage unit according to an embodiment.

Firstly, referring to FIG. 3, the horizontal axis represents when a physical force is not sensed from an acceleration device (0%) and when the physical force is sensed from the acceleration device (100%), the left vertical axis represents the magnitude Id of a D axis current provided to a motor, and the right vertical axis represents the RPM of the motor.

As shown in FIG. 3, when a physical force is not sensed form the acceleration device (when a driver does not step on an acceleration pedal), the inverter 100 may provide a D axis current fixed to 30.3 A to the motor 200. If the physical force is sensed form the acceleration device (when the driver steps on the acceleration pedal), the inverter 100 may change a D axis current to provide, to the motor 200, a D axis current corresponding to an RPM. In particular, the inverter 100 may change the D axis current to 60 A when the physical force is sensed from the acceleration device (at 0 RPM), to 50 A when the RPM of the motor 200 becomes 250, to 40 A when the RPM of the motor 200 becomes 500, to 35 A when the RPM of the motor 200 becomes 750, and to 30.3 A when the RPM of the motor 200 becomes 1000. A D axis current value corresponding to the value of each RPM may be a value that enables the motor 200 to generate the maximum torque at a corresponding RPM. Also, the value of each RPM and the D axis current value are only examples.

The graph of FIG. 3 is re-drawn by using only the RPM of the motor 200 and a D axis current, FIG. 4 is obtained. Referring to FIG. 4, as the RPM of the motor 200 increases, the magnitude of a D axis current may decrease. The reason is because while the RPM of the motor 200 increases and the maximum torque of the motor 200 is obtained at a corresponding RPM, the magnitude of the D axis current is reflected. Also, if the RPM of the motor 200 is equal to or greater than 1000, the D axis current has a fixed value.

Next, FIG. 5 shows an example of a lookup table that contains the RPM of the motor 200 and a D axis current corresponding to the RPM, the lookup table being stored in the storage unit 150. Each value is only an example.

In another embodiment, the storage unit 150 may match the RPM of the motor 200, the maximum torque value of the motor 200 corresponding to the RPM, and a D axis current corresponding to the maximum torque value of the motor 200, and store them. That is, the storage unit 150 may store the RPM of the motor 200, the maximum torque value of the motor 200 corresponding to the RPM, and a D axis current corresponding to the maximum torque value of the motor 200, in a lookup tabular form.

Refer back to FIG. 2.

The current searching unit 140 may search for a D axis current corresponding to the measured RPM of the motor 200, in the storage unit 150, and deliver information on a found D axis current to the control unit 160 of the inverter 100.

The control unit 160 of the inverter 100 controls the current providing unit 110 so that the current providing unit 110 provides, to the motor 200, the D axis current found in the storage unit 150, in step S109. That is, in order that as an acceleration device of an EV operates, a D axis current corresponding to the RPM of the motor 200 is provided to the motor 200, the control unit 160 may control the current providing unit 110 and change the D axis current. In particular, the control unit 160 may change the D axis current to obtain the maximum torque corresponding to the RPM of the motor 200.

The inverter 100 according to an embodiment changes the D axis current provided to the motor 200.

On the other hand, when it is determined that the acceleration device of an EV does not operate, the current providing unit 110 of the inverter 100 returns to step S101 to provide a fixed D axis current to the motor 200.

Next, a change in torque of the motor 200 when a D axis current according to an embodiment is changed is described with reference to FIGS. 6 and 7.

Figure 6:
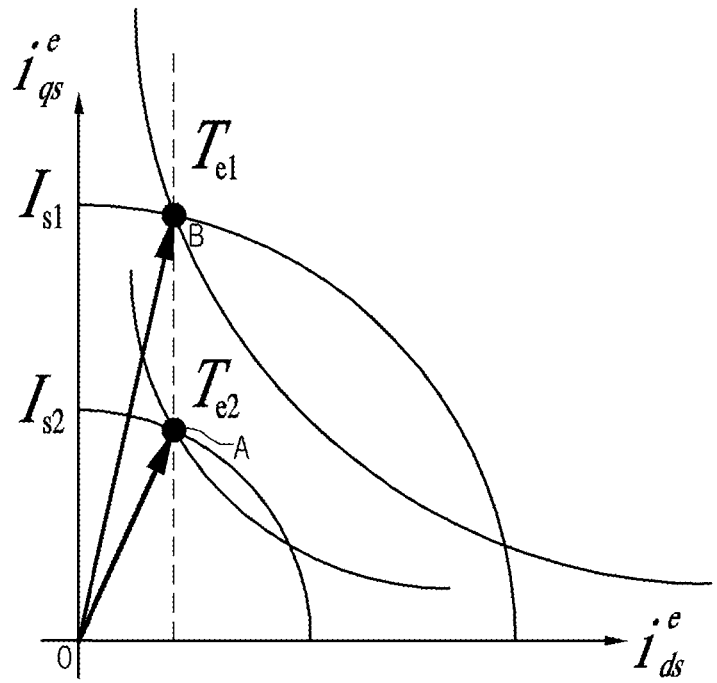
FIG. 6 depicts a change in torque when typically fixing a D axis current and changing a Q axis current.
Figure 7:
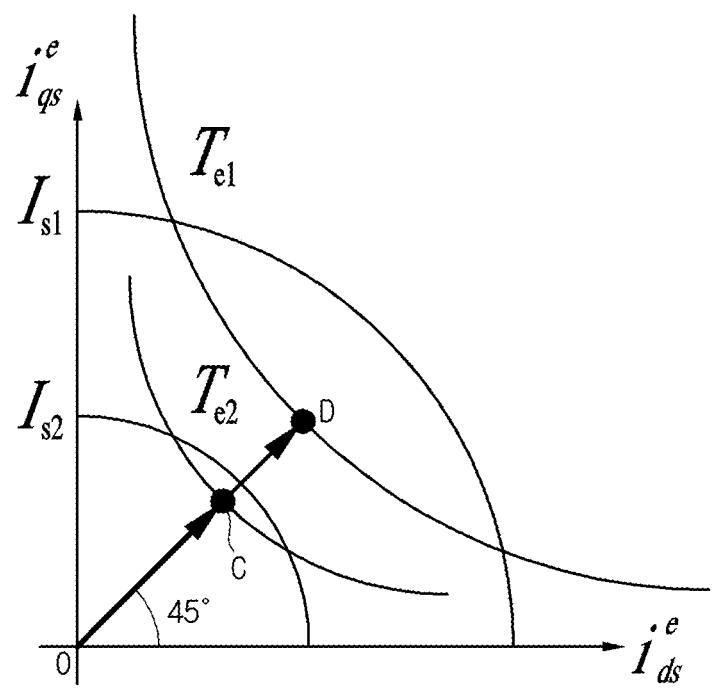
FIG. 7 depicts a change in torque when changing a D axis current and a Q axis current by an inverter according to an embodiment.

FIG. 6 depicts a change in torque when typically fixing a D axis current and changing a Q axis current, and FIG. 7 depicts a change in torque when changing a D axis current and a Q axis current by an inverter according to an embodiment.

Referring to FIGS. 6 and 7, the x axis represents the D axis stator current (D axis current) of a synchronous reference frame, and the y axis represents the Q axis stator current (Q axis current) of the synchronous reference frame. Also, Te1 and Te2 represents the maximum torque curves at corresponding RPM. In this example, it is assumed that RPM for the Te1 torque curve is larger than RPM for the Te2 torque curve. Also, an induction motor applied to an EV may be driven through vector control, and a current provided to the induction motor may be expressed as a sum of a D axis current vector and a Q axis current vector. That is, the square of the magnitude of a driving current provided to the induction motor may be expressed as a sum of the square of the magnitude of a D axis current vector and the square of the magnitude of a Q axis current vector.

Firstly, referring to FIG. 6, if a certain physical force is applied to an acceleration device and then a greater force is applied, the RPM of an induction motor may increase and the torque of the induction motor may also increase accordingly. In this case, a typical inverter has fixed a D axis current vector to have torque corresponding to the increased RPM of the induction motor and has increased a Q axis current vector.

More particularly, in order to increase the torque of the induction motor, a typical inverter has increased only the magnitude of a Q axis current vector from the point A to the point B to obtain the maximum torque corresponding to the increased RPM. However, in this case, since the D axis current vector is fixed and only the magnitude of the Q axis current vector increases, there was a limitation in that a Q axis current excessively increases and thus current consumption is high. Also, since the magnitude of a driving current provided to the induction motor increases, current consumption may become high. Also, since the D axis current vector is fixed, it was difficult to accurately match a current provided to the induction motor with the Te1 curve on which the maximum torque is generated at corresponding RPM.

Next, referring to FIG. 7, if a certain physical force is applied to an acceleration device and then a greater force is applied, the RPM of the induction motor may increase and the torque of the induction motor may also increase accordingly. In this case, the inverter 100 according to an embodiment may increase both the D axis current vector and the Q axis current vector to have torque corresponding to the increased RPM of the induction motor.

More particularly, in order to increase the torque of the induction motor, the inverter 100 according to an embodiment may increase both the magnitude of the D axis current vector and the magnitude of the Q axis current vector from the point C to the point D to obtain the maximum torque corresponding to the increased RPM. Thus, since an increase in Q axis current may be less relatively than that of FIG. 6, current consumption may decrease. Also, it may be seen that changing the D axis current according to an embodiment in order to generate the same torque (move to the Te1 torque curve) is less in the magnitude of a driving current than fixing the D axis current and thus current consumption decreases. Also, the inverter 100 may increase the magnitude of the D axis current vector to accurately match a current provided to the induction motor with the Te1 curve on which the maximum torque is generated at corresponding RPM.

According to an embodiment, the above-described method may also be embodied as processor readable codes on a program-recorded medium. Examples of the processor readable medium are a ROM, a RAM, a CD-ROM, a magnetic tape, a floppy disk, an optical data storage device, and a carrier wave form (such as data transmission through the Internet).

The above-described inverter is not limited to the configuration and method of the above-described embodiments, and some or all of the embodiments may also be selectively combined so that various variations may be made.

What is claimed is:

1. An inverter comprising:
    a current providing unit configured to provide a first axis current and a second axis current to an induction motor, wherein the first axis current is a quadrate axis current and the second axis current is a direct axis current;
    a revolutions per minute (RPM) measuring unit configured to measure a RPM of the induction motor; and
    a control unit configured to:
    change the quadrate axis current and the direct axis current according to the measured RPM to allow the induction motor to have a maximum torque at the measured RPM if an acceleration of an electronic vehicle operates; and
    fix the direct axis current and change the quadrate current if the acceleration of the electronic vehicle does not operate.

2. The inverter according to claim 1, further comprising a storage unit configured to match and store the measured RPM with the second axis current corresponding to the measured RPM.

3. The inverter according to claim 2, wherein the control unit is further configured to control the current providing unit to search for a stored second axis current corresponding to the measured RPM and provide the stored second axis current to the induction motor.

4. A method of controlling an inverter, the method comprising:
    providing a first axis current and a second axis current to an induction motor, wherein the first axis current is a quadrate axis current and the second axis current is a direct axis current;
    measuring a RPM of the induction motor;
    changing the quadrate axis current and the direct axis current according to the measured RPM to allow the induction motor to have a maximum torque at the measured RPM if an acceleration of an electronic vehicle operates; and
    fixing the direct axis current and changing the quadrate current if the acceleration of the electronic vehicle does not operate.

5. The method according to claim 4, further comprising matching and storing the measured RPM with the second axis current corresponding to the measured RPM.

6. The method according to claim 5, wherein the changing of the second axis current comprises controlling a current providing unit to search for a stored second axis current corresponding to the measured RPM and providing the stored second axis current to the induction motor.

* * * * *